March 4, 1952 — W. SCHMID ET AL — 2,588,298
APPARATUS FOR FORMING LUBRICATION FITTINGS
Filed March 15, 1950 — 3 Sheets-Sheet 1
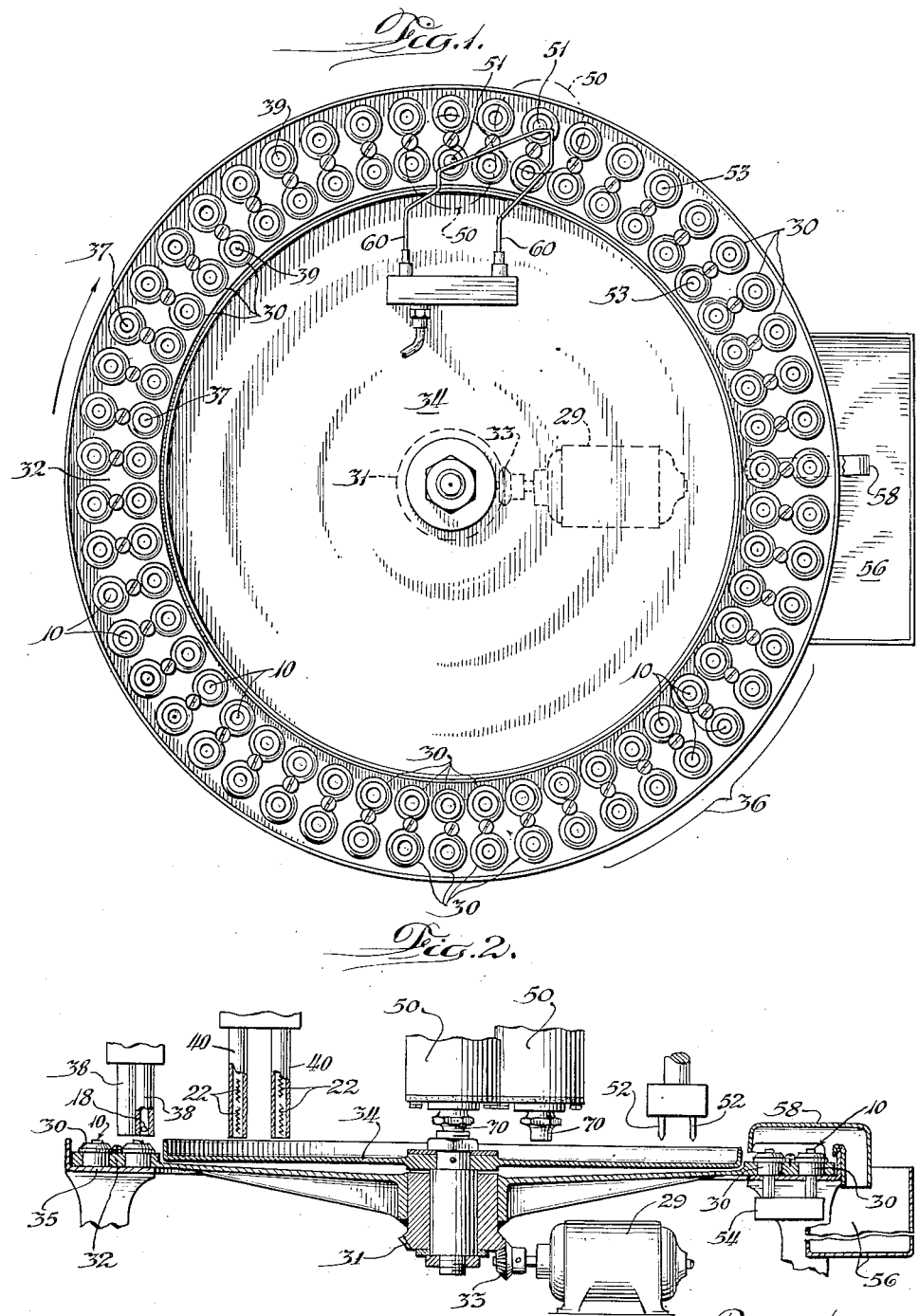

March 4, 1952 W. SCHMID ET AL 2,588,298
APPARATUS FOR FORMING LUBRICATION FITTINGS
Filed March 15, 1950 3 Sheets-Sheet 2
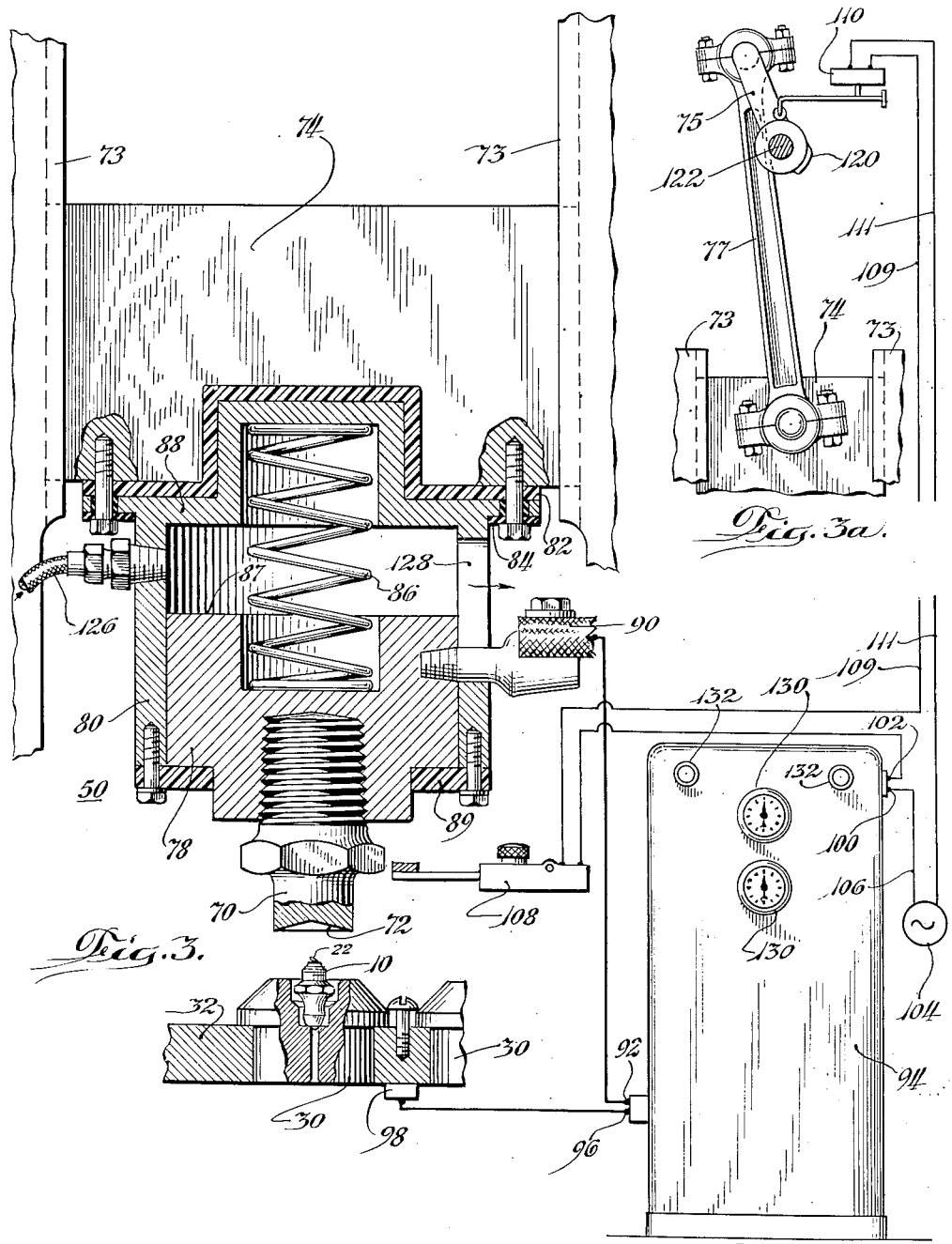

March 4, 1952 W. SCHMID ET AL 2,588,298
APPARATUS FOR FORMING LUBRICATION FITTINGS
Filed March 15, 1950 3 Sheets-Sheet 3
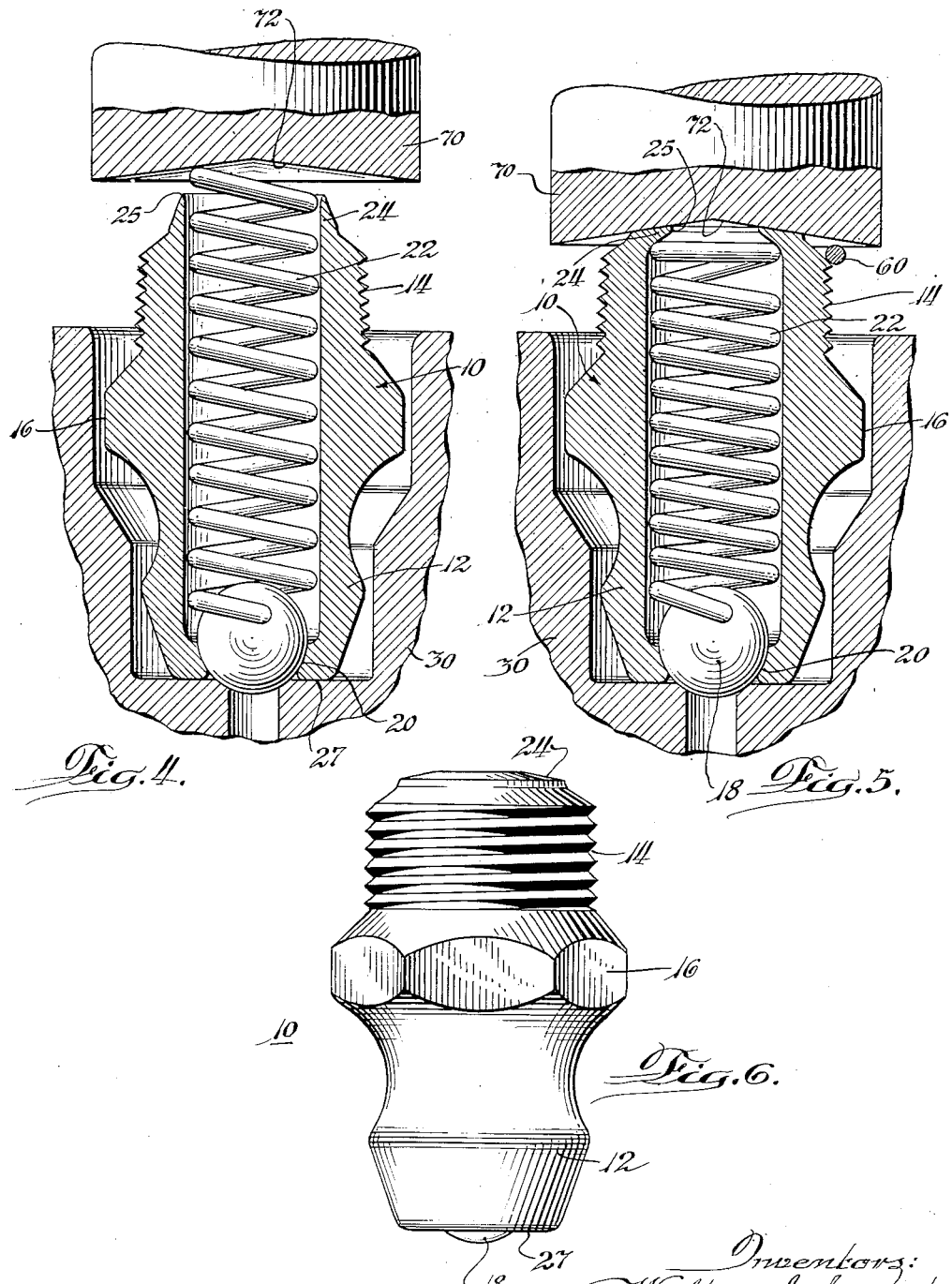

Patented Mar. 4, 1952

2,588,298

UNITED STATES PATENT OFFICE 2,588,298

APPARATUS FOR FORMING LUBRICATION FITTINGS

Walter Schmid and John A. Simkus, Chicago, Ill., assignors to Stewart-Warner Corporation, Chicago, Ill., a corporation of Virginia Application March 15, 1950, Serial No. 149,704

5 Claims. (Cl. 219—3)

This invention relates generally to a method and apparatus for crimping lubrication fittings. For example, this invention may be applied to form inwardly a thin-walled tubular end portion of a lubrication fitting in order to form a seat for retaining a check valve spring.

An object of this invention is to provide a method and apparatus whereby the metal to be crimped is softened momentarily by heat in order to facilitate the crimping operation.

A further object is to provide a crimping method and apparatus whereby the metal to be crimped is softened without destroying the hardness of the fitting.

A further object of this invention is to provide a method and means for preventing cracking, breakage, and weakening of crimps which were common in the prior art.

A further object is to provide a method and apparatus for crimping parts made of materials which are too hard to be crimped by other methods.

A further object is to provide a method and apparatus for rapidly heating and crimping metal parts.

A further object is to provide a method and apparatus for crimping with great facility whereby the crimp is heated for softening without unduly discoloring the surface of the part.

A still further object of this invention is to provide a method and means for crimping a part whereby the portion to be crimped is softened for crimping and rehardened after the crimping operation.

Further objects and advantages, together with the principles of this invention will be apparent from the following description together with the drawings, in which:

Fig. 1 is a plan view of a machine for assembling lubrication fittings which embodies the principles of this invention;

Fig. 2 is an elevational sectional view of a portion of the illustrative machine;

Figs. 3 and 3a are elevational views of portions of the machine and are partly schematic and partly in section, Fig. 3 being approximately full size, and Fig. 3a being somewhat less than full size;

Figs. 4 and 5 are sectional views, greatly enlarged, of a fitting, together with a portion of the machine, illustrating two stages in the spring seat forming process; and Fig. 6 is an elevational view, greatly enlarged, of a finished fitting crimped according to the principles of this invention.

Fig. 6 illustrates a finished lubrication fitting 10 having a head portion 12 adapted to be engaged by a coupler, not shown, on an apparatus for supplying lubricant under high pressure to the fitting. The fitting 10 has a threaded end portion 14 for securing the fitting to a machine part to be lubricated, and a hexagonal portion 16 for engagement by a wrench.

Referring to Fig. 5, the internal chamber of the tubular fitting 10 contains a ball check valve 18 urged into engagement with a seat portion 20 of the fitting 10 by a helical compression spring 22. The spring 22 is retained in the fitting 10 by a crimped seat or lip 24.

The principles of this invention will be described with particular illustrative reference to a method and apparatus for inwardly forming a lip such as the spring retaining lip 24. If the fitting 10 is made of a malleable material, the spring seat 24 may be formed by a cold forming process. However, such a fitting 10 is so soft that it quickly wears out when subjected to hard service, which is often encountered on machines which require frequent lubrication, such as industrial machines and equipment. It is very desirable to provide fittings 10 which are very hard to withstand such severe service. The desired degree of hardness may readily be achieved by known methods such as cold working and cyanide or case hardening processes. However, a degree of hardening which provides worth-while improvement in the serviceability of the fitting renders the fittings so hard and brittle that cold crimping of the spring retaining lip 24 is impossible, since the lip shatters or cracks when subjected to crimping pressure. This invention provides a method and apparatus for forming such hardened fittings.

In accordance with this invention the spring retaining lip 24 may be formed on a lubrication fitting 10 which is extremely hard and brittle. The fitting 10 preferably is positioned with the unformed thin walled tubular lip 24 uppermost (Fig. 4), and the ball valve 18 and the valve spring 22 are inserted into the fitting 10. Then an electric current is passed through all portions of the lip 24 to heat the lip by resistance heating. The current preferably is passed longitudinally through the lip 24 so that the current density is greatest and the heating is most intense at the narrow edge 25 of the lip 24, where the greatest deformation occurs when the lip 24 is crimped. The body of the fitting 10 is not heated substantially because the body has a relatively great cross-sectional area and consequently a relatively small resistance. The current preferably is passed through the lip 24 by establishing a difference of potential between the edge 25 of the lip and the body of the fitting 10. This preferably is done by establishing an electric circuit through the fitting 10 by contacting all portions of the edge 25 of the lip 24. Heat due to contact resistance thereby is generated at the edge 25 of the lip 24. A surface of the fitting 10, such as the end 27 of the head 20, also is contacted to complete the electrical circuit, but substantial heating of this surface is not produced because of the relatively large area of contact and the consequent relatively small contact resistance thereof.

After a brief interval the unformed lip 24 is heated to a temperature at which it is relatively pliable. Crimping force is then applied to the lip 24. The softened metal of the lip is forced radially inwardly and longitudinally downwardly (Fig. 5) so that the lip 24 is turned inwardly and downwardly to form a shoulder for retaining the spring 22. While the shoulder 24 is being formed the spring 22 is compressed and thereby is positioned within the tubular chamber of the fitting 10.

When the forming operation is completed, heating of the lip 24 is stopped and the lip is rehardened by rapid cooling both by radiation and conduction to the cool body of the fitting and to the die. The cooling is rapid enough so that a quenching effect occurs, and the lip 24 thereby again becomes nearly as hard as the other portions of the fitting 10.

By employing electrical contact resistance heating, the amount of heat supplied to the lip 24 may be closely controlled by adjusting the heating time and the current through the lip. Just enough heat is supplied to secure the desired pliability for completing the crimping operation. Such an amount of heat does not unduly discolor the surface of the lip 24 nor permanently soften the lip materially. To a great extent the heat is localized in the thin walled lip 24, and the other portions of the fitting 10 remain relatively cool throughout the crimping process. The surface appearance and the hardness of the portions of the fitting other than the lip 24 are virtually unaffected by the crimping process.

The process of this invention may be carried out, for example, by a machine for assembling lubrication fittings. Referring to Figs. 1 and 2, the machine comprises a plurality of nests 30 supported in two concentric rows around the periphery of a turntable 32. As best illustrated in Fig. 3, each of the nests 30 is recessed to hold a lubrication fitting 10. Means such as an electric motor 29 (Fig. 2), a gear 31, and a pinion 33 are provided for rotating the turntable 32 clockwise intermittently (Fig. 1). A flat circular stationary pan 34 covers the top center portion of the turntable 32 and a stationary bed 35 supports the lower side of the periphery of the turntable. The machine operator inserts the unassembled lubrication fittings 10 into the nests 30 as they pass his station 36 (Fig. 1). At stations 37 ball check valves 18 are inserted into a pair of fittings 10 by two air operated ball feeders 38, and at stations 39 valve springs 22 are dropped into another pair of fittings by two air operated spring feeders 40. Two crank operated punches 50 crimp the spring retaining lips 24 of a pair of fittings 10 at stations 51, and two air operated conically pointed fingers 52 are inserted into the spring seats 24 and springs 22 at stations 53 for centering the springs to correct any possible misalignment which might cause the springs to protrude from the fittings 10 after the crimping operation. A power operated retaining wire 60 holds the fittings 10 in the nests 30 during the return stroke of the punches 50. The assembled fittings 10 are blown out of the nests 30 by a blower 54 and are directed into a receptacle 56 by a hood 58. The turntable 32 advances intermittently, stopping momentarily for simultaneous performance of the various assembly operations upon different fittings 10.

Referring to Fig. 3, the punches 50 individually comprise a cylindrical forming die 70 having a conically concave forming face 72 shaped to provide the desired angle of crimp. The angle of depression of the forming face 72 may be about 12°, for example. The die 70 may be made of a hard material, such as Carboloy or tungsten carbide in order to withstand a long period of service. The punch 50 is mounted on a ram 74 which is given a vertical reciprocating motion along supporting guides 73 by a crank 75 (Fig. 3a) and a connecting rod 77. Each of the dies 70 is threaded into a cylindrical slide 78 mounted for vertical sliding motion in a tubular slideway 80. The slideway 80 is secured to the ram 74 but is electrically insulated therefrom by an insulating spacer 82 and washers 84. The slide 78 is urged downwardly by a compression spring 86. Upward relative motion of the die-carrying slide 78 within the slideway 80 is limited by engagement of the top surface 87 of the slide with the upper wall 88 of the interior chamber of the slideway, and the wall thereby provides an upper stop for the slide. A plate 89 secured to the lower end of the slideway 80 provides a lower stop for the slide 78.

A flexible electrically conductive cable 90 capable of carrying a relatively large electric current is secured to the slide 78 and is connected with a secondary terminal 92 of a resistance heating transformer 94. Another secondary terminal 96 of the transformer 94 connects with a conductive brush 98 contacting the turntable 32. A primary terminal 100 of the transformer 94 is connected with an alternating current power source 104 by a conductor 106, and another primary terminal 102 is connected with the source by a series circuit comprising a normally closed safety switch 108, a conductor 109, a normally open control switch 110 (Fig. 3a), and a conductor 111. The control switch 110 is operated by a cam 120 mounted on a shaft 122 which also supports the crank 75.

Compressed air for cooling the punch 50 is supplied through an air hose 126 to the interior of the slideway 80. The air escapes through an opening 128 in the slideway 80 which also serves as a passageway for the cable 90 which is connected with the slide 78.

Each of the punches 50 is provided with a separate cable 90, secondary circuit 92, 96, primary circuit 100, 102, control switch 110, cam 120, and safety switch 108 for separate timing of the heating current supplied to each punch 50 and separate current amplitude adjustment by means of two control wheels 130. Two pilot lights 132 indicate when the two heating circuits are energized.

In Figs. 3 and 3a the ram 74 is shown near the beginning of its downward stroke. The control switch 110 is open, and the transformer 94 is not energized.

As the ram 74 moves downwardly, the die 70 engages and compresses the valve spring 22 (Fig.

4), and then contacts the edge 25 of the thin-walled lip 24. The lip 24 arrests the downward motion of the die 70, but the ram 74 and the slideway 80 continue to move downward so that the slideway slips over the slide 78 and the spring 86 is compressed. The force exerted by the spring 86 urges the die 70 into positive electrical contact with all portions of the edge 25 of the lip 24. At this point the cam 120 closes the control switch 110 and thereby energizes the transformer 94. A comparatively large current flows from the secondary terminal 92 through the cable 90, the slide 78, the die 70, the lip 24, the body of the fitting 10, the nest 30 is contact with the fitting, the turntable 32, the brush 98, and thence to the other secondary terminal 96. Relatively little current flows from the die 70 through the valve spring 22 because of the relatively great resistance of the current path through the spring.

The force of the spring 86 is sufficient to establish a positive electrical contact between the die 70 and the lip 24 but is not great enough to damage the lip 24 or complete the crimping operation. Flashing or arcing between the die 70 and the lip 24 is avoided by establishing a firm electrical contact before turning on the heating current.

By the time the upper wall 88 of the slideway 80 engages the top 87 of the slide 78, the lip 24 is heated to a relatively pliable state. The die 70, moving downwardly with the slide 78 and the slideway 80, now exerts crimping force on the edge 25 of the lip 24. Because of the conically concave shape of the forming face 72 of the die 70, the crimping force is exerted radially inwardly as well as downwardly. The die 70 completes the crimp by forming the lip 24 inwardly and downwardly until the end of the downward stroke of the ram 74 and the die 70 is reached, as illustrated in Fig. 5. Just before the end of the downward stroke of the die 70, the cam 120 opens the control switch 110 and turns off the heating current.

The spring 86 holds the die 70 in contact with the fitting 10 as the slideway 80 slips upwardly along the slide 78. The finished lip 24 is cooled rapidly by conduction to the cool body of the fitting and to the die 70, which remains relatively cool throughout the crimping operation because of the relatively large size of the die 70 and the cooling effect of the air supplied by the hose 126. The quenching effect of the rapid cooling rehardens the lip 24. Arcing between the die 70 and the fitting 10 is avoided because the heating current is turned off before the contact with the fitting is broken. Discoloration of the surface of the fitting, which might be caused by arcing, is thereby avoided.

Before the die 70 disengages the fitting 10, the retaining wire 60 is advanced by air pressure to engage the fitting, as illustrated in Figs. 1 and 5. The retaining wire 60 holds the fittings 10 in the nests 30 despite any tendency of the fittings to adhere to the dies 70 because of the crimping heat and pressure or magnetization of the dies. After the dies 70 have been disengaged from the fittings 10 the retaining wire 60 is withdrawn to permit unobstructed rotation of the turntable 32.

Occasionally the machine operator may neglect to insert a fitting 10 into a particular nest 30. When this occurs, the die 70 comes into contact with the nest 30 during the downward stroke of the ram 74. However, short circuiting of the heating transformer 94 is avoided by the operation of the safety switch 108. During normal operation of the punch 50, the slide 78 does not engage the safety switch because downward motion of the slide is arrested by the fitting 10. However, the slide 78 engages the safety switch 108 and opens the primary circuit of the transformer 94 before the die 70 can contact the nest 30. Damage to the nest 30, the die 70, and the transformer 94, which might occur due to short circuiting of the transformer secondary, is thereby avoided. By adjustment of the cam 120 and the control wheels 130, the duration and intensity of the heating current are adjusted to heat the lip 24 sufficiently to facilitate the crimping operation and to prevent weakening, cracking or breakage of the lip 24. Enough heat may be produced in the lip 24 for crimping fittings made of even the hardest available steels.

On the other hand, the cam 120 and control wheels 130 are adjusted to provide the minimum amount of heat necessary for crimping in order to prevent softening of the body of the fitting 10 and undue discoloration of the surface of the fitting. By this process and apparatus the slight discoloration produced usually is confined to the surface of the lip 24 and in any case does not extend beyond the first few threads of the threaded portion 14.

The resistance heating process employed in this invention localizes the heating effect in the lip 24 and especially near the edge 25 of the lip. Substantial heating of the body of the fitting 10 does not occur and so softening of the fitting is avoided.

The crimping operation may be completed very rapidly by the method and apparatus of this invention. For example, the machine illustrated usually is operated to complete a pair of fittings in approximately one second to obtain a production rate of approximately 7,000 per hour. Heating of the lip 24 occurs only during a small portion of the downward stroke of the punch 50 and so the heating time is a small fraction of one second.

While we have described this invention by disclosing the details of a specific illustrative embodiment, it will be apparent to those skilled in the art that the principles of this invention may be applied in ways which may differ in detail from the embodiment described herein. Therefore, the details of this disclosure should not be construed to limit this invention except as set forth in the appended claims which are intended to be a complete and concise statement of the scope of this invention.

We claim:

1. A machine for crimping a thin-walled lip of a tubular portion of a hard metal lubricant receiving fitting, comprising a vertically movable ram, a die having a concave face mounted on said ram, power driven means for imparting a vertical reciprocating motion to said ram and said die, a holder for electrically contacting and positioning the fitting with the lip uppermost for engagement with said die during the lower portion of the motion of the die, apparatus to furnish electrical heating current, means connecting said die and said holder in circuit with said apparatus, control means for energizing said apparatus for a heating interval upon engagement of said die with the lip, means providing lost motion between said ram and said die to permit the downward motion of said die to be arrested by said lip during the heating interval in which the lip is heated to a relatively pliable state, and cooperating means on the die and the ram limiting the lost motion to move said die downward after the heating interval to crimp said lip, said means providing lost motion being effective to maintain said die in contact with the fitting for cooling the fitting during a portion of the return stroke of the ram.

2. Apparatus for turning inward a thin-walled extension of a tubular portion of a hard metal lubricant receiving fitting to form a seat for retaining a check valve spring, comprising a holder for positioning the fitting with the extension uppermost and for electrically contacting the fitting, means for inserting the check valve and the spring into the fitting, a vertically movable ram, a die having a concave face movably mounted on said ram, an upper stop and a lower stop on said ram for limiting the relative motion of said die, yieldable means urging said die downward against said lower stop, a source of electric heating current, means connecting said die and said holder in circuit with said source, power driven means connected with said ram for reciprocating said ram downward and upward, said die being thereby moved downward to compress said spring and to contact the extension, control means for energizing said source for a heating interval after said die contacts the extension to heat the extension to a relatively pliable state, said power driven means continuing to move said ram downward while said die is arrested by said extension and until said upper stop engages said die and moves said die downward to turn said extension radially inward and downward, said ram being thereupon withdrawn upward by the power driven means while said yieldable means maintains said die in contact with the fitting for an interval to cool the fitting.

3. A machine for crimping a thin-walled lip of a tubular portion of a hard metal lubricant receiving fitting, comprising a vertically movable die, power driven means for imparting a vertical reciprocating motion to said die, a holder for electrically contacting and positioning the fitting with the lip uppermost for engagement with said die during the lower portion of the motion of the die, apparatus to furnish electrical heating current, means connecting said die and said holder in circuit with said apparatus, control means for energizing said apparatus for a heating interval upon engagement of said die with the lip to soften said lip by heat, means providing lost motion between said power driven means and said die whereby the downward motion of said die is arrested by said lip during the heating interval, and means limiting the lost motion to move said die downward after the heating interval to crimp said lip.

4. A machine for crimping a lip of a tubular portion of a hard metal fitting, comprising a movable die, power driven means for imparting an inward and outward reciprocating motion to said die, a holder for electrically contacting and positioning the fitting with the lip facing said die for engagement with said die during an inner portion of the motion of the die, apparatus to furnish electrical heating current, means connecting said die and said holder in circuit with said apparatus, a current being passed through the lip for a heating interval upon contacting said die to soften said lip by heat, means providing lost motion between said power driven means and said die whereby the inward motion of said die is arrested by said lip during the heating interval, and means limiting the lost motion to move said die downward after the heating interval to crimp said lip.

5. Apparatus for crimping a thin-walled extension of a tubular portion of a hard metal fitting, comprising a holder for positioning the fitting with the extension uppermost and for electrically contacting the fitting, a vertically movable ram, a die movably mounted on said ram, an upper stop and a lower stop on said ram for limiting the motion of said die relative to said ram, yieldable means urging said die downward against said lower stop, a source of electric heating current, means connecting said die and said holder in circuit with said source, power driven means connected with said ram for reciprocating said ram downward and upward, said die being thereby moved downward to contact the extension, a current being thereupon passed by said source through said extension for a heating interval to heat the extension to a relatively pliable state, said power driven means continuing to move said ram downward while said die is arrested by said extension and until said upper stop engages said die and moves said die downward to crimp said extension, said ram being thereupon withdrawn upward by the power driven means until said lower stop disengages said die from said fitting.

WALTER SCHMID.
JOHN A. SIMKUS.

REFERENCES CITED

The following references are of record in the file of this patent:

UNITED STATES PATENTS

| Number | Name | Date |
|---|---|---|
| 1,135,727 | Schmidt | Apr. 13, 1915 |
| 1,173,214 | Postel | Feb. 29, 1916 |
| 1,174,446 | Rietzel | Mar. 7, 1916 |
| 1,718,715 | Spencer | June 25, 1929 |
| 1,848,905 | Raberzzana | Mar. 8, 1932 |
| 1,861,005 | Gibb | May 31, 1932 |
| 2,111,916 | Middleton | Mar. 22, 1938 |
| 2,178,032 | Clausen | Oct. 31, 1939 |